United States Patent
Arya et al.

(10) Patent No.: US 10,417,059 B1
(45) Date of Patent: Sep. 17, 2019

(54) STAGED APPLICATION PROGRAMMING INTERFACE

(71) Applicants: Amit Arya, Cuppertino, CA (US); George Chiramattel Kunjachan, San Jose, CA (US); Peter Vogel, Santa Clara, CA (US); Tyler Riding, Sunnyvale, CA (US); Jennifer Martin, Los Altos, CA (US)

(72) Inventors: Amit Arya, Cuppertino, CA (US); George Chiramattel Kunjachan, San Jose, CA (US); Peter Vogel, Santa Clara, CA (US); Tyler Riding, Sunnyvale, CA (US); Jennifer Martin, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/054,729

(22) Filed: Aug. 3, 2018

(51) Int. Cl.
  *G06F 9/54* (2006.01)
  *G06K 9/62* (2006.01)
  *G06F 16/21* (2019.01)
  *G06F 16/2457* (2019.01)

(52) U.S. Cl.
  CPC .............. *G06F 9/54* (2013.01); *G06F 16/211* (2019.01); *G06F 16/24578* (2019.01); *G06K 9/6215* (2013.01)

(58) Field of Classification Search
  None
  See application file for complete search history.

(56) References Cited

U.S. PATENT DOCUMENTS

| | | | | |
|---|---|---|---|---|
| 9,753,744 | B1 * | 9/2017 | Wells | G06F 16/2423 |
| 10,148,493 | B1 * | 12/2018 | Ennis, Jr. | H04L 41/0803 |
| 2018/0336493 | A1 * | 11/2018 | Hayes | G06F 9/54 |

* cited by examiner

*Primary Examiner* — Craig C Dorais
(74) *Attorney, Agent, or Firm* — Ferguson Braswell Fraser Kubasta PC

(57) ABSTRACT

A method may include receiving, via a network and from a source application, partial data including values for parameters defined according to an application programming interface (API). Each parameter may be defined by the API as optional. The partial data may be incomplete for use by a target application. The method may further include obtaining a set of contextual data correlated with the partial data, generating augmented partial data by combining the partial data and contextual data selected from the set of contextual data, determining that the augmented partial data satisfies a transaction completion criterion of a transaction schema, and in response to determining that the augmented partial data satisfies the transaction completion criterion, sending the augmented partial data to a transaction store used by the target application.

20 Claims, 10 Drawing Sheets

STAGED APPLICATION PROGRAMMING INTERFACE

BACKGROUND

Communication between applications is often limited via application programming interfaces (APIs) that require values for a fixed number of parameters, for example, where back-end systems create transaction records using parameter values provided by applications. Conventional transaction processing systems include a specification of entities whose values are required to complete a transaction. However, scenarios exist in which useful processing and integration may occur in the absence of complete information.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, via a network and from a source application, partial data including values for parameters defined according to an application programming interface (API). Each parameter is defined by the API as optional. The partial data is incomplete for use by a target application. The method further includes obtaining a set of contextual data correlated with the partial data, generating augmented partial data by combining the partial data and contextual data selected from the set of contextual data, determining that the augmented partial data satisfies a transaction completion criterion of a transaction schema, and in response to determining that the augmented partial data satisfies the transaction completion criterion, sending the augmented partial data to a transaction store used by the target application.

In general, in one aspect, one or more embodiments relate to a system including a memory coupled to a processor, a repository including augmented partial data, a ranking model, a transaction schema including a transaction completion criterion, and an application programming interface (API) that defines parameters. Each parameter is defined as optional. The system further includes a stage controller executing on the processor and using the memory, configured to receive, via a network and from a source application, partial data including values for the parameters. The partial data is incomplete for use by a target application. The stage controller is further configured to generate the augmented partial data by combining the partial data and contextual data selected from a set of contextual data correlated with the partial data, determine that the augmented partial data satisfies the transaction completion criterion, and in response to determining that the augmented partial data satisfies the transaction completion criterion, send the augmented partial data to a transaction store used by the target application. The system further includes a contextualizer, executing on the processor and using the memory, configured to obtain the set of contextual data.

In general, in one aspect, one or more embodiments relate to an application programming interface (API), including executable code stored in a memory and executed on a processor, further including instructions that perform: receiving, via a network and from a source application, partial data including values for parameters. Each parameter is defined as optional. The partial data is incomplete for use by a target application. The instructions further perform transmitting, to a staging platform executing on the processor and using the memory, the partial data. The staging platform obtains a set of contextual data correlated with the partial data, generates augmented partial data by combining the partial data and contextual data selected from the set of contextual data, determines that the augmented partial data satisfies a transaction completion criterion of a transaction schema, and in response to determining that the augmented partial data satisfies the transaction completion criterion, sends the augmented partial data to a transaction store used by the target application.

Other aspects of the invention will be apparent from the following description and the appended claims.

DETAILED DESCRIPTION

Figure 1A:
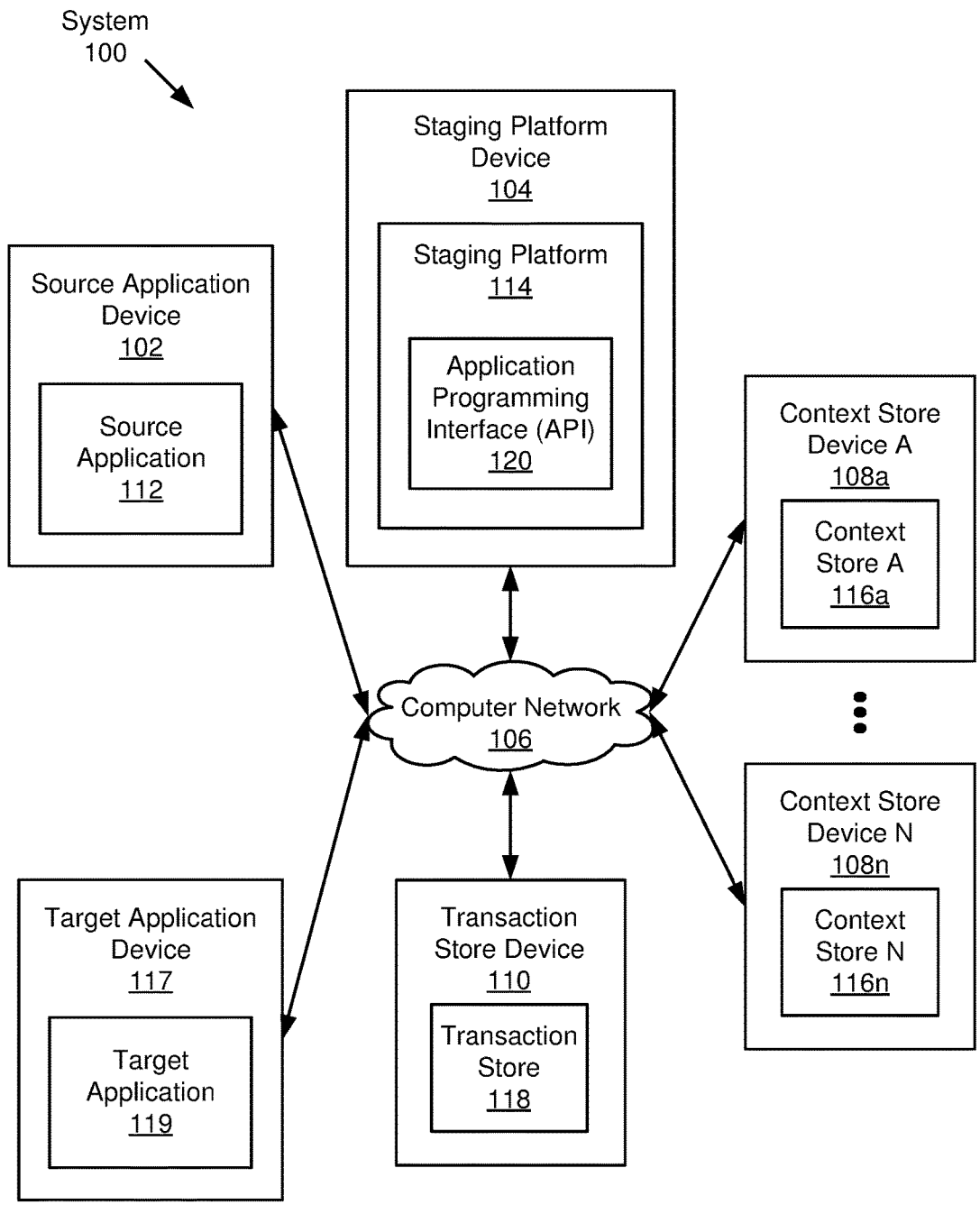
FIG. 1A, FIG. 1B, and FIG. 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a system, method, and non-transitory computer readable medium for a staged application programming interface (API). In one or more embodiments, the API receives partial data including values for parameters defined by the API, each of which may be optional.

The API may provide the partial data to a staging platform that infers a series of enhancements to the incomplete partial data (e.g., received via a third-party application). The partial data is incomplete in that the partial data partially describes a transaction to be eventually stored at a transaction store. Because the partial data is incomplete, the partial data is not usable by a target application. The staging platform may generate the augmented partial data by finding missing data needed to complete a transaction record.

Once the augmented partial data satisfies a transaction completion criterion associated with a transaction store (e.g., a user's accounting system), the augmented partial data may be pushed to the transaction store. The contextual data used in the posted transaction may be deduplicated to avoid the proliferation of redundant data. Thus, whereas the partial data is unusable by the target application, the augmented partial data is usable by the target application.

Permitting the partial data to be incomplete frees the user from the burden of providing each detail required for a complete transaction, where the staging platform may complete the transaction using contextual data obtained from a variety of context stores. For example, the user may not be required to fill out each field of an invoice.

FIG. 1A shows a system (100) in accordance with one or more embodiments of the invention. As shown in FIG. 1A, the system (100) includes a source application device (102), a staging platform device (104), a computer network (106), context store devices (108a, 108n), a transaction store device (110), and a target application device (117). The various devices and systems shown in FIG. 1A may correspond to the computing system (500) described with respect to FIG. 5A and the accompanying description below, or take the form of the client device (526) described with respect to FIG. 5B. In one or more embodiments, the source application device (102), staging platform device (104), context store devices (108a, 108n), transaction store device (110), and target application device (117) may communicate via the computer network (106) (e.g., the network (520) described with respect to FIG. 5B).

In one or more embodiments of the invention, the source application device (102), staging platform device (104), context store devices (108a, 108n), transaction store device (110), and/or target application device (117) include any type of storage unit and/or device (e.g., a file system, database, collection of tables, or any other storage mechanism) for storing data. Further, the source application device (102), staging platform device (104), context store devices (108a, 108n), and/or transaction store device (110) may include multiple different storage units and/or devices. The multiple different storage units and/or devices may or may not be of the same type or located at the same physical site.

In one or more embodiments, the source application device (102) includes a source application (112). The source application device (102) may originate partial data (124) that may eventually become part of transaction data (128). The source application (112) is any software application used by multiple users (e.g., over a network). For example, the source application (112) may be an inventory, production, or logistics management application, or a personal financial management application, such as Mint® (Mint is a trademark of Intuit, Inc., Mountain View, Calif.).

In one or more embodiments, the target application device (117) includes a target application (119). The target application device (117) may receive transaction data (128) (e.g., corresponding to completed transactions) from the transaction store device (110). The target application (119) is any software application used by multiple users (e.g., over a network). The target application (119) may include functionality to process and/or analyze completed transactions corresponding to transaction data (128).

In one or more embodiments, the staging platform device (104) includes a staging platform (114). In one or more embodiments, the staging platform (114) includes an application programming interface (API) (120). The API (120) may include a defined set of methods of communication between software components (e.g., between the source application (112) and the staging platform (114)). The API (120) may be accessible to software components via the computer network (106). The API (120) is discussed in further detail in reference to FIG. 1B.

Continuing with FIG. 1A, in one or more embodiments, a transaction store device (110) includes a transaction store (118). A transaction store (118) stores information about transactions. In one or more embodiments, a transaction describes an event. For example, a transaction may describe (e.g., in a database record) raw materials, an inventory item, production or logistics operation, an invoice, sales receipt, estimate, payment, purchase order, credit card authorization, etc. Examples of transaction stores (118) include personal financial management applications, such as Mint®, and business management applications, such as Intuit® QuickBooks Online® (Intuit and QuickBooks Online are trademarks of Intuit, Inc., Mountain View, Calif.), that store information about transactions of users and enable users to manage the user's financial activities.

In one or more embodiments, context store devices (108a, 108n) include context stores (116a, 116n). A context store (116a) may store information that provides contextual information about transactions. Examples of context stores (116a, 116n) include: email systems, online calendar systems, texting systems (e.g., systems based on Short Message Service (SMS), Multimedia Messaging Service (MMS), etc.), messaging applications (e.g., instant messaging applications), etc.

Figure 1B:
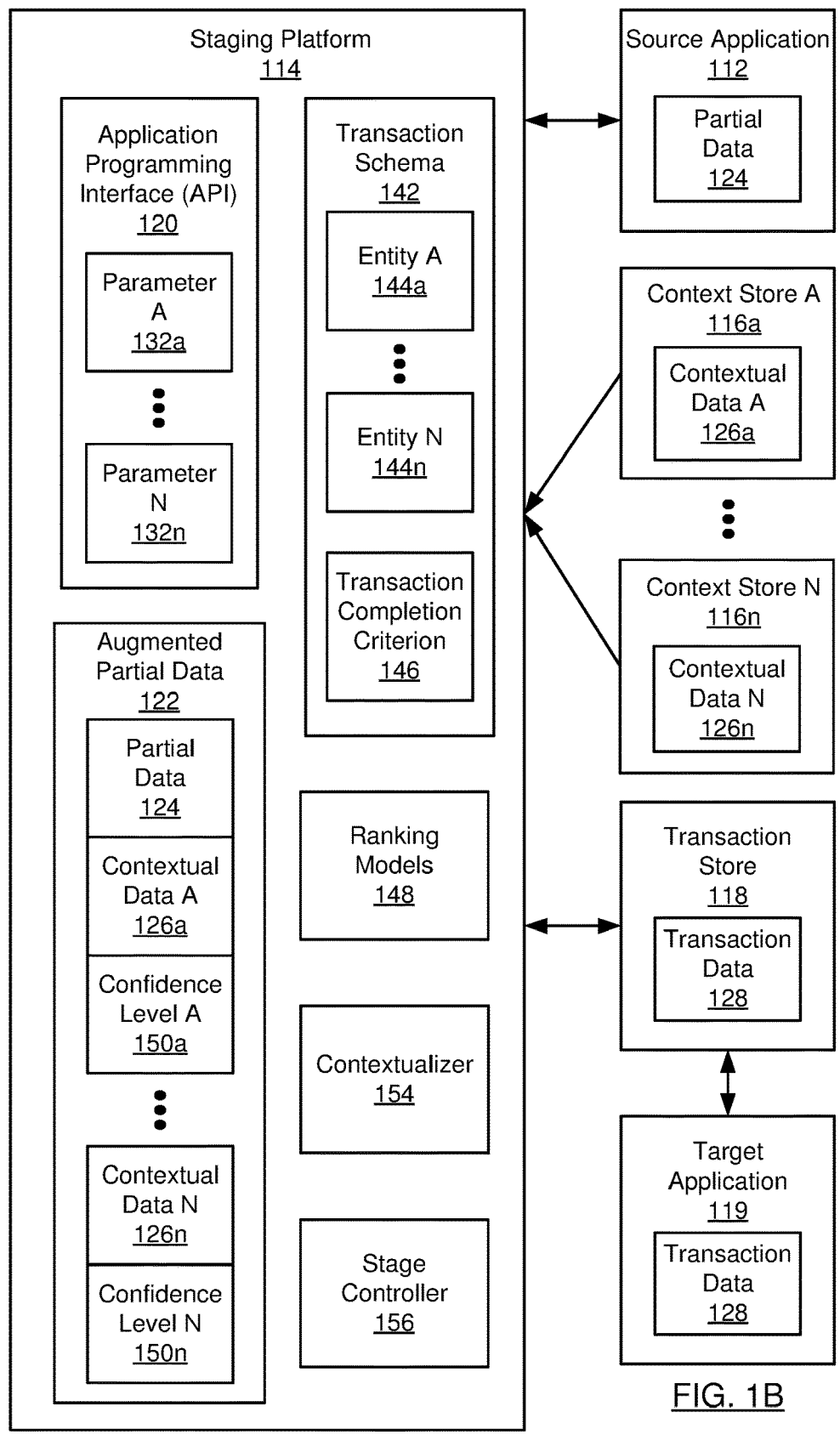

Turning to FIG. 1B, in one or more embodiments, the source application (112) includes partial data (124). In one or more embodiments, the partial data (124) includes one or more values corresponding to the parameters (132a, 132n) defined by the API (120) of the staging platform (114). For example, the partial data (124) may include values for fields in an online form or database record. In one or more embodiments, the partial data (124) is partial data that does not qualify as transaction data (128), as discussed below. For example, the partial data (124) may include terms and a due date for an invoice, but may be missing the customer, service category, and service date.

In one or more embodiments, the staging platform (114) is software, hardware, or any combination thereof that includes functionality to create transaction data (128) from partial data (124). The staging platform (114) includes the API (120), augmented partial data (122), a transaction schema (142), and ranking models (148). Each of these components is discussed below.

The API (120) is the interface of the staging platform that defines exactly how the source application (112) is to communicate with the staging platform (114). Specifically, the API (120) may include method or subroutine names (not shown), communication protocols (not shown) to use for the communication, the format for entity values transmitted in the communication (not shown), etc. that the API requires in order to process a communication received from the source application (112). The API may further define the expected output for the communication.

Among the above definitions in the API, the API (120) may include a set of parameters (132a, 132n) for which data values may be provided. Specifically, for each entity of which the staging platform may receive a value from the source application, a parameter exists for the entity. The parameters (132) are described in reference to FIG. 1C.

Figure 1C:
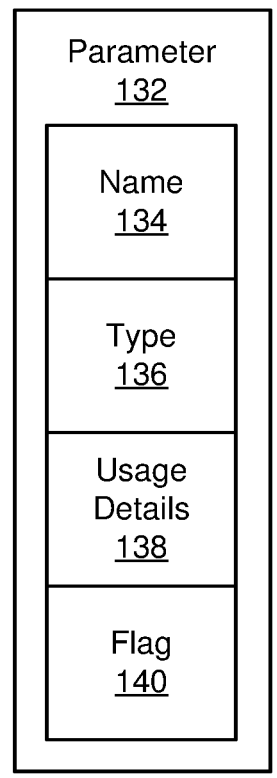

Turning to FIG. 1C, a parameter (132) is a definition of the format of the entity value being received by the API.

Each parameter (132) may include a name (134), a type (136), usage details (138), and a flag (140). The name (134) may be an identifier associated with the parameter (132). The type (136) (e.g., "person", "location", "date", "quantity", "product", or "organization", etc.) may be a type of entity associated with the parameter (132). The usage details (138) may indicate how the value of the parameter (132) is to be interpreted and/or validated. For example, the usage details (138) may specify that a date be interpreted according to a specific format (e.g., MM/DD/YY). The flag (140) may indicate whether or not a value for the parameter (132) is required. In one or more embodiments, the flag (140) may indicate that a parameter (132) is optional. For example, the value of a parameter may be optional because the value is based on data included in a remote system that is not directly accessible. In one or more embodiments, the flag (140) for every parameter in the API, and, thus, for every entity defined in the API, indicates that the parameter is optional.

Returning to FIG. 1B, in one or more embodiments, the transaction schema (142) includes entities (144a, 144n) and a transaction completion criterion (146). The transaction schema (142) is an organizational structure for transaction data. The transaction schema (142) may be specific to the transaction type (e.g., invoice, payment, estimate, credit card authorization, purchase order, etc.). In one or more embodiments, the entities (144a, 144n) are elements of a transaction for which data values may be provided. For example, an entity (144a) may correspond to a field in a table of a database or a field in an online form. The entity may be an attribute of the transaction. In one or more embodiments, the communication of at least some of the entities (144a, 144n) is defined by the parameters (132a, 132n) of the API (120). The transaction schema (142) may also define constraints and/or validation rules applicable to the data values corresponding to the entities (144a, 144n). For example, the transaction schema (142) may define constraints on the type and/or range of values for one or more entities (144a, 144n) (e.g., fields in a table).

In one or more embodiments, the transaction store (118) includes transaction data (128). In one or more embodiments, the transaction data (128) includes values corresponding to the entities (144a, 144n) defined by a transaction schema (142). For example, the transaction data (128) may include values for the fields of a database record. In one or more embodiments, the transaction data (128) satisfies a transaction completion criterion (146) as defined by the transaction schema (142). For example, the transaction completion criterion (146) may specify which entities (144a, 144n) are required to have values in order for the transaction data (128) to describe a complete transaction. Furthermore, the transaction completion criterion (146) may specify constraints on a value (e.g., a value range, such as a range of income) of one or more entities (144a, 144n).

In one or more embodiments, each context store (116a, 116n) includes contextual data (126a, 126n). Contextual data (126a, 126n) is data describing the context of the transaction. The context is the circumstances surrounding the transaction, such as the customer, the location of the customer, what the customer purchased, how the customer interacted with the vendor, etc. In one or more embodiments, contextual data (126a) includes a value that corresponds to an entity (144a) defined by a transaction schema (142). For example, contextual data (126a) may be the name of a customer for an invoice transaction. In one or more embodiments, contextual data (126a) includes a timestamp (e.g., a date) indicating when the contextual data (126a) was generated.

Although not shown in FIG. 1B, contextual data may be intermixed with irrelevant data in the context store. For example, consider the scenario in which two friends are discussing their upcoming trip to Peru. Intermixed in the discussion about planning the trip, one friend sends a message that says, "While we are gone, Mr. Paint Company is painting our house. He comes on Tuesday." The other friend responds with a thumbs up sign and the first friend says, "We are only paying $6500". Intermixed with the contextual data, such as the company being Mr. Paint Company, the painting being performed on Tuesday during the time they are in Peru, and cost is $6500, is irrelevant data, such as all of the planning, that the trip is to Peru, the thumbs up sign, etc.

Continuing with FIG. 1B, in one or more embodiments, augmented partial data (122) includes partial data (124), contextual data (126a, 126n), and confidence levels (150a, 150n). Augmented partial data (118) may be partial data (124) enhanced by contextual data (126a, 126n) that is correlated with the partial data (124). In one or more embodiments, the augmented partial data (122) represents data that is in a pending or intermediate state, where the augmented partial data (122) is not yet ready to be sent to a transaction store (118). The augmented partial data (122) may be the result of combining the partial data (124) with the contextual data (126a, 126n) in a linear fashion, such that the augmented partial data (122) includes the partial data (124) augmented with the contextual data (126a, 126n). For example, the contextual data (126a, 126n) may provide values for one or more entities without a corresponding value in the partial data (124). Alternatively or additionally, the augmented partial data (122) may be the result of combining the partial data (124) with the contextual data (126a, 126n) in a nonlinear fashion, such that the contextual data (126a, 126n) may be used to modify one or more values of the partial data (124).

In one or more embodiments, contextual data (126a) includes a value for an entity (144a) defined in a transaction schema (142) of the staging platform (114) (e.g., where the partial data (124) does not include a value for the entity (144a)). For example, the partial data (124) may include values that describe the sender and service date of an invoice (e.g., where an invoice is a type of transaction), where the recipient and service category of the invoice are missing, and may be provided using contextual data (126a, 126n).

In one or more embodiments, the confidence level (150a, 150n) indicates the strength of the correlation between the partial data (124) and the contextual data (126a, 126n). The confidence level (150a) may be a probability whose value is between 0 and 1 that predicts the likelihood of the corresponding contextual data (126a) being correlated with the partial data (124). For example, a confidence level of 0.2 may indicate that there is a 0.2 probability that the corresponding contextual data (e.g., a person's name) is correlated with specific partial data (e.g., a partially filled out online form, such as an invoice).

In one or more embodiments, the correlation between the partial data (124) and the contextual data (126a) may be based on a predefined matching criterion. The matching criterion may be based on identity. For example, the same or similar identifier may be associated with the name of a person, product, or organization referenced by both the partial data (124) and the contextual data (126a). The matching criterion may be temporal. For example, a time interval (e.g., a date) may be associated with both the partial data (124) and the contextual data (126a). The matching criterion may be spatial. For example, nearby locations (e.g., as measured by a distance function) may be associated with both the partial data (124) and the contextual data (126a). The matching criterion may be numerical. For example, a similar numerical quantity (e.g., within a numerical range) may be associated with both the partial data (124) and the contextual data (126a).

Continuing with FIG. 1B, in one or more embodiments, the contextualizer (154) may be implemented in hardware (e.g., circuitry), software, firmware, and/or any combination thereof. In one or more embodiments, the contextualizer (154) includes functionality to obtain contextual data (126a) from a context store (116a). The contextualizer (154) may include functionality to use a ranking model (148) to assign a confidence level (150a) that represent the strength of the correlation between the contextual data (126a) and the partial data (124). The contextualizer (154) may include functionality to obtain transaction data (128) from the transaction store (118).

In one or more embodiments, the contextualizer (154) includes functionality to deduplicate contextual data (126a) before combining the contextual data (126a) with partial data (124). For example, the values included in contextual data (126a) may be replaced with a reference to the contextual data (126a) in the context store (116a) when the contextual data (126a) is combined with partial data (124).

In one or more embodiments, the stage controller (156) may be implemented in hardware (e.g., circuitry), software, firmware, and/or any combination thereof. In one or more embodiments, the stage controller (156) includes functionality to select an entity (144a) of a transaction schema (142) for which to obtain contextual data (126a). The stage controller (156) may include functionality to create augmented partial data (122) by combining partial data (124) with contextual data (126a, 126n).

In one or more embodiments, the ranking models (148) are machine learning models (e.g., classifiers). The ranking models (148) may be trained using transaction data (128) of a transaction store (118). In other words, the training data (e.g., inputs) of the ranking models (148) may include completed transactions. In one or more embodiments, the training data is partitioned into user-specific training data and user-generic training data. The user-specific training data may be transaction data (128) specific to a user (e.g., invoices created by a specific user). In other words, the user-specific training data may be based on the behavior of a specific user.

The user-generic training data may be transaction data (128) that is not specific to any user (e.g., invoices created by all users). In other words, the user-generic training data may be based on the aggregated behavior of all users. Alternatively, the user-generic training data may be transaction data (128) corresponding to users sharing a common attribute (e.g., location, income level, profession/industry, etc.). Thus, the user-generic training data may be based on the aggregated behavior of all users belonging to a group (e.g., a group defined by a common attribute). In one or more embodiments, user attributes are defined in user profiles (158).

In one or more embodiments, the ranking models (148) are trained on transaction data (128) by correlating the values of entities (144a, 144n) defined by a transaction schema (142). Each ranking model (148) may learn a correlation of values of one or more input entities with a value of an output entity, thereby establishing a basis for predicting the value of the output entity based on the values of the input entities. Each ranking model (148) may learn multiple such correlations, where each correlation is based on a specific combination of input entities and an output entity. For example, it may be useful to predict a value for the output entity when a value for the output entity is missing from partial data (124) or augmented partial data (122). In one or more embodiments, the output entity corresponds to contextual data (126a) included in a context store (116a).

In one or more embodiments, the ranking models (148) address the problem of how to create augmented partial data (122) by enhancing partial data (124) using contextual data (126a, 126n) correlated with the partial data (124), in order to complete a transaction (e.g., where the transaction is defined by a transaction schema (142)). The ranking models (148) address the problem of providing missing values in partial transaction data. For example, the data required to complete the transaction may be stored remotely, and therefore may be difficult to access and identify.

In one or more embodiments, the output of applying a ranking model (148) to partial data (124) and contextual data (126a, 126n) includes confidence levels (150a, 150n) that indicate the strength of the correlation between the partial data (124) and the contextual data (126a, 126n). Using the machine learning model may permit reliable correlation of contextual data (126a, 126n) with partial data (124). In other words, in the absence of a machine learning model, the correlation between contextual data (126a, 126n) and the partial data (124) may be ambiguous and unreliable.

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
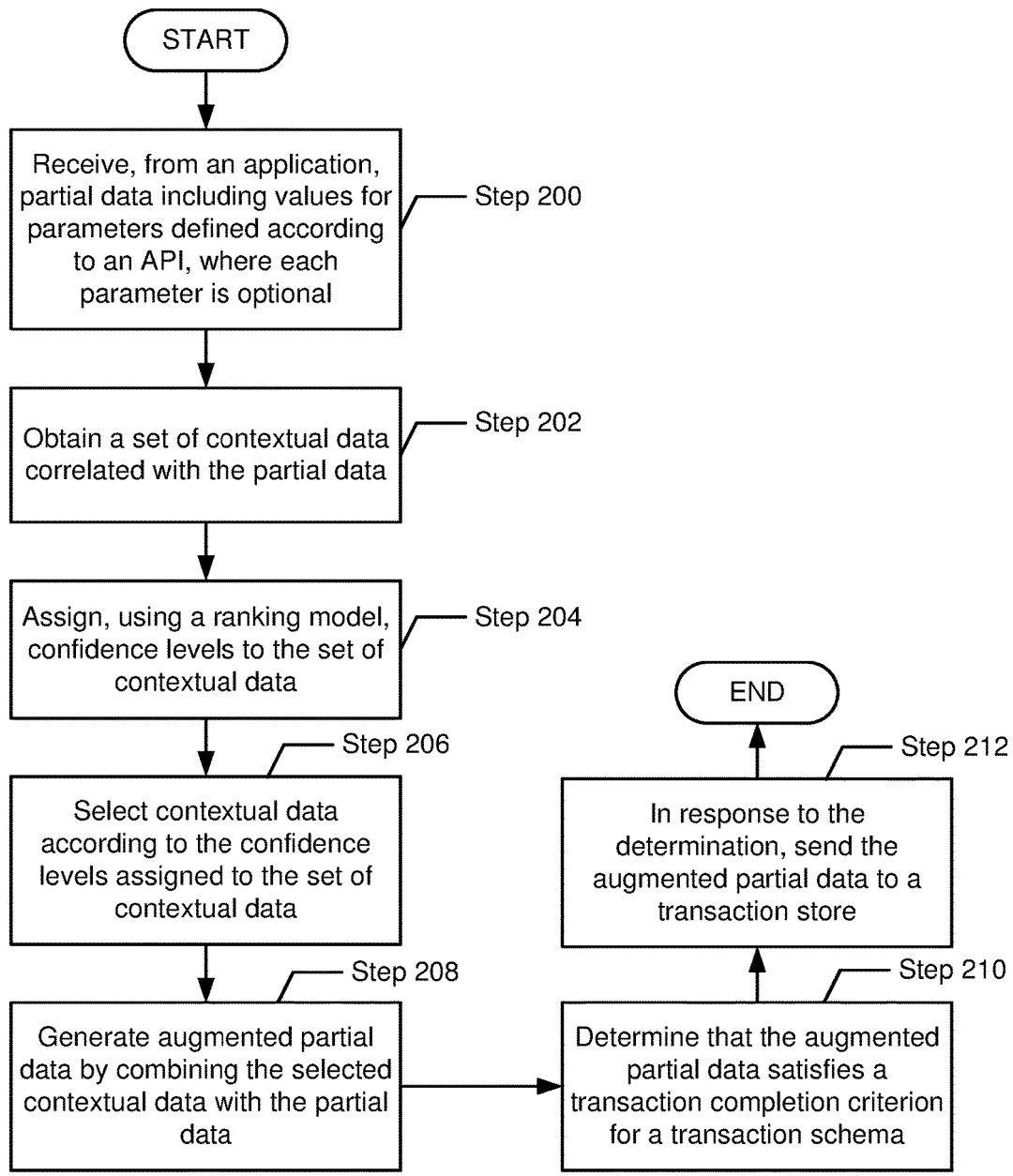
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for operating a staged application programming interface (API). One or more of the steps in FIG. 2 may be performed by the components (e.g., the contextualizer (154) and stage controller (156) of the staging platform (114)) discussed above in reference to FIG. 1A and FIG. 1B. In one or more embodiments, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, partial data is received from the source application. The partial data may not represent a complete transaction. For example, the partial data may lack information used by the target application (e.g., the target application may operate on completed transaction data). In one or more embodiments, the source application and/or the user are not required to provide a value for each entity included in a complete transaction. Instead, the source application and/or the user are permitted to initiate the storing of a partial, incomplete transaction record. This capability was not feasible in the past, in part due to the manner in which database systems operate (e.g., due to unique key requirements of databases). However, since the API permits each parameter to be defined as optional, partial information about a transaction may be augmented with information gathered via machine learning, to synthesize a complete transaction. Thus, a recording of the complete transaction may be generated from incomplete partial data, when the values for one or more entities are missing or unknown. For example, values may be missing because a user has forgotten certain details and has not kept accurate records. Further, values may be unknown because certain values are stored in remote systems (e.g., remote context stores). In one or more embodiments, the partial data includes updated values for previously received partial data.

Thus, the source application gathers the values of the parameters that the source application has, with or without user input. The values are populated into a request according to the API and the request is transmitted to the staging platform. Because all parameters of the API are optional in accordance with one or more embodiments, the staging platform does not have prior knowledge as to any data that will be present in the request and any data that is missing.

In Step 202, a set of contextual data correlated with the partial data is obtained. In one or more embodiments, contextual data corresponds includes a value for an entity defined by a transaction schema. For example, the contextual data may be the name of a customer for an invoice transaction. The contextual data may be correlated with the partial data using a matching criterion. The matching criterion may be based on identity. For example, the same or similar identifier may be associated with the name of a person, product, or organization referenced by both the partial data and the contextual data. Alternatively, the matching criterion may be temporal. For example, a time interval (e.g., a date) may be associated with both the partial data and the contextual data.

In Step 204, a ranking model is used to assign confidence levels to the set of contextual data. For example, the confidence levels may provide guidance regarding which contextual data to combine with the partial data. In one or more embodiments, the ranking model is a machine learning model. The machine learning model may be trained using completed transactions.

In one or more embodiments, the ranking model is trained on transaction data by correlating the values of entities defined by a transaction schema. The ranking model may learn the correlation of values of one or more input entities with the value of an output entity, thereby establishing a basis for predicting the value of the output entity based on the values of the input entities. As an example, an input entity "customer" may be correlated with an output entity "service category" in order to predict the service category based on the customer, where an invoice transaction schema defines both entities. The ranking model may learn multiple such correlations, where each correlation is based on a specific combination of input entities and an output entity. For example, it may be useful to predict a value for the output entity when a value for the output entity is missing from partial data. In one or more embodiments, the output entity corresponds to contextual data included in a context store.

In one or more embodiments, the output of applying the ranking model to partial data and contextual data includes a confidence level indicating the strength of the correlation between the partial data and the contextual data. The confidence level may be based, in part, on the frequency with which the contextual data appears with the partial data in the training data (e.g., the frequency with which the contextual data appears with the partial data within the same transaction record in the training data) used by the ranking model.

In Step 206, contextual data is selected according to the confidence levels assigned to the set of contextual data. For example, the contextual data with the highest confidence level may be selected.

In Step 208, augmented partial data is generated by combining the selected contextual data with the partial data.

In one or more embodiments, the augmented partial data is generated when the confidence level assigned to the contextual data exceeds a predetermined threshold. In one or more embodiments, the augmented partial data is the result of adding the selected contextual data to the partial data.

In Step 210, it is determined that the augmented partial data satisfies a transaction completion criterion for a transaction schema. In one or more embodiments, the transaction completion criterion specifies which entities (e.g., defined by the transaction schema) are required to have values in a complete transaction. In one or more embodiments, there are multiple transaction completion criteria for a transaction schema. In one or more embodiments, the transaction completion criterion specifies constraints on a value (e.g., a value range, such as income level) of one or more entities.

In one or more embodiments, the transaction schema is selected by applying a rule based on the source application. For example, the source application may be associated with one or more transaction types, each having a corresponding transaction schema.

In Step 212, the augmented partial data is sent to a transaction store, in response to determining that the augmented partial data satisfies the transaction completion criterion. That is, the augmented partial data may now be considered transaction data that describes a new completed transaction. The transaction store may be used by the target application, for example, to process and/or analyze completed transactions.

In one or more embodiments, the next augmented partial data may be used to update existing transaction data present in the transaction store. For example, existing transaction data in an accounting application may have been entered manually by a user, and next augmented partial data based on a PayPal or credit card transaction may be used to correct or update a user-entered value in the existing transaction data.

In one or more embodiments, a categorization utility of the staging platform links the transaction data to other entities defined by the transaction store. For example, a reference to an account (e.g., listed in a chart of accounts) may be added to transaction data that corresponds to an invoice.

In one or more embodiments, if the stage controller determines (e.g., using named entity resolution (NER)) that the augmented partial data duplicates existing data present in the transaction store, then the stage controller may replace the duplicate data in the next augmented partial data with a reference to the existing transaction data, to avoid the proliferation of redundant data. For example, a transaction store may define various entities corresponding to customers, inventory items, vendors, sales tax items, etc.

In one or more embodiments, the stage controller assigns the contextual data to a parameter of the API without a corresponding value in the partial data. For example, the contextual data may be a customer name corresponding to a customer parameter defined by the API whose value was not provided by the partial data.

In one or more embodiments, the stage controller sends the contextual data to the source application. For example, the source application may be able to utilize the value of the API parameter that had been previously left unassigned by the source application.

Figure 3A:
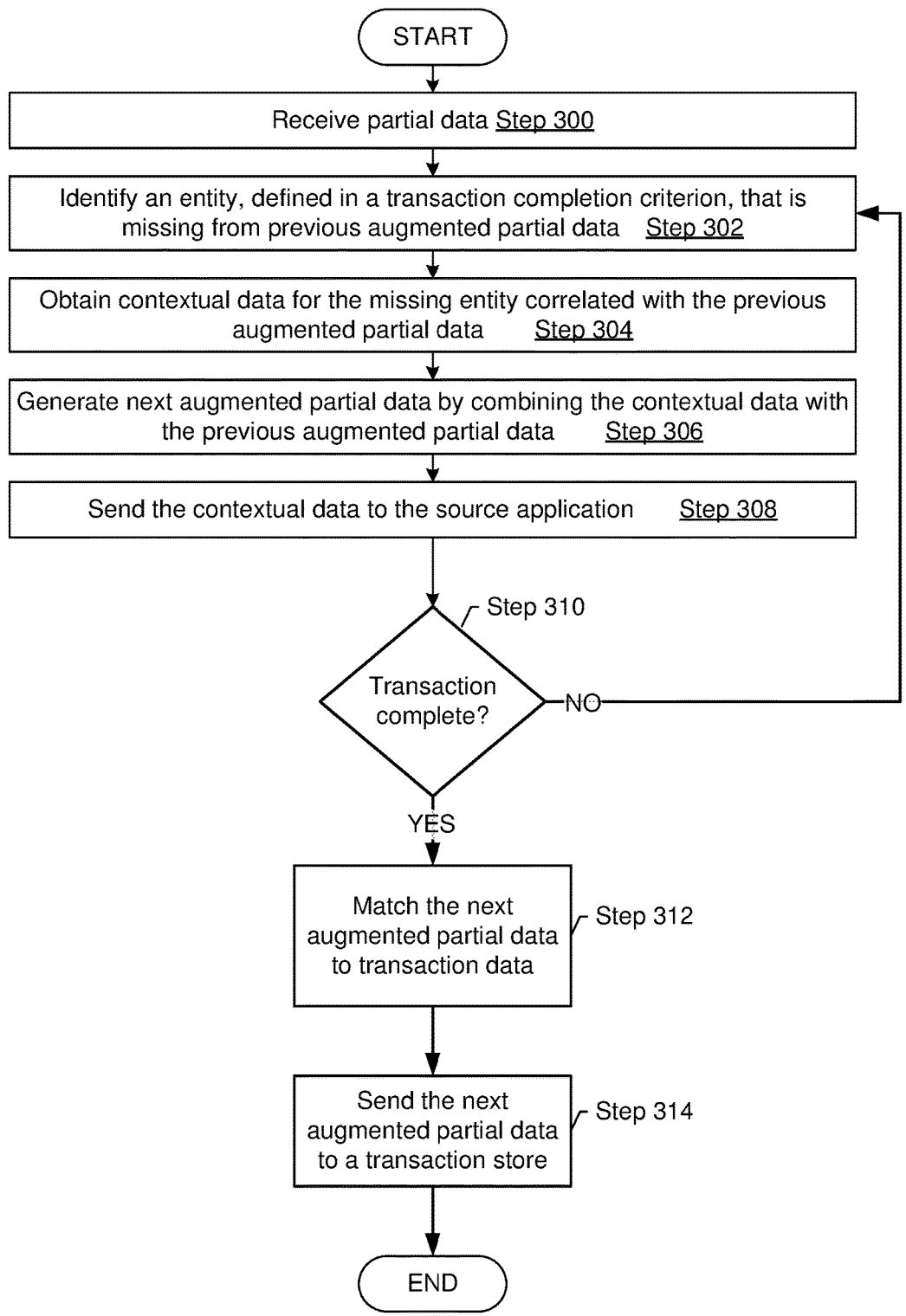

FIG. 3A shows a flowchart in accordance with one or more embodiments of the invention. The flowchart depicts a process for staging transactions. One or more of the steps in FIG. 3A may be performed by the components (e.g., the contextualizer (154) and stage controller (156) of the staging platform (114)) discussed above in reference to FIG. 1A and FIG. 1B. In one or more embodiments, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, partial data is received (see description of Step 200 above).

In Step 302, an entity defined in a transaction completion criterion is identified. The entity may be identified by the stage controller. In one or more embodiments, there is no value corresponding to the entity in the previous augmented partial data (see description of Step 208 above). For example, the customer name may be missing from the partially filled out invoice. In such a scenario, an attempt may be made to add a value (e.g., the name of a customer) to the previous augmented partial data (e.g., a partially filled out invoice) to bring the previous augmented partial data closer to satisfying the transaction completion criterion for a transaction schema (e.g., an invoice transaction schema). For example, the previous augmented partial data may have been generated in a previous iteration of Step 306 below. Alternatively, when executing Step 302 for the first time, a value corresponding to the entity may be missing from the partial data.

In Step 304, contextual data correlated with the previous augmented partial data is obtained for the missing entity (see descriptions of Step 202 above and Step 338 below). For example, the contextual data may be the name of a customer for an invoice transaction. The contextual data may be obtained from the contextualizer.

In Step 306, next augmented partial data is generated by combining the contextual data with the previous augmented partial data (see description of Step 208 above). For example, the name of the customer may be added to the previous augmented partial data that corresponds to the partially filled out invoice. In one or more embodiments, the contextual data may be combined with the previous augmented partial data in a nonlinear fashion, such that the contextual data may be used to modify one or more values of the previous augmented partial data.

In Step 308, the contextual data is sent to the source application. For example, the source application may be able to utilize the contextual data during its processing (generating other transactions, etc.).

If, in Step 310, it is determined that the next augmented partial data satisfies the transaction completion criterion, then Step 312 below is executed. Otherwise, if Step 310 determines that the next augmented partial data does not satisfy the transaction completion criterion, then Step 302 is again executed to identify another entity without a corresponding value in the next augmented partial data.

In Step 312, the next augmented partial data is matched to transaction data. For example, the transaction data may be included in a transaction store different from the transaction store associated with the transaction completion criterion. In one or more embodiments, the matching is based on a matching criterion (e.g., based on a temporal match and an identity match). For example, the next augmented partial data may describe a PayPal transaction, which may be matched to a corresponding Shopify transaction, where both transactions occur within a few minutes of each other and/or describe transactions involving a similar price, and correspond to the same user. Alternatively, the next augmented partial data may describe a bank transaction, which may be matched with a sales receipt or credit card charge. A reference to the matched transaction data may be added to the next augmented partial data.

In Step 314, the next augmented partial data is sent to a transaction store (see description of Step 212 above). For example, the transaction store may store completed transaction data satisfying the transaction completion criterion. In one or more embodiments, Step 302 above may be executed again to initiate additional enhancements of the next augmented partial data aimed at satisfying another transaction completion criterion for another transaction schema. For example, the other transaction schema may require a superset of the entities with corresponding values in the next augmented partial data.

Figure 3B:
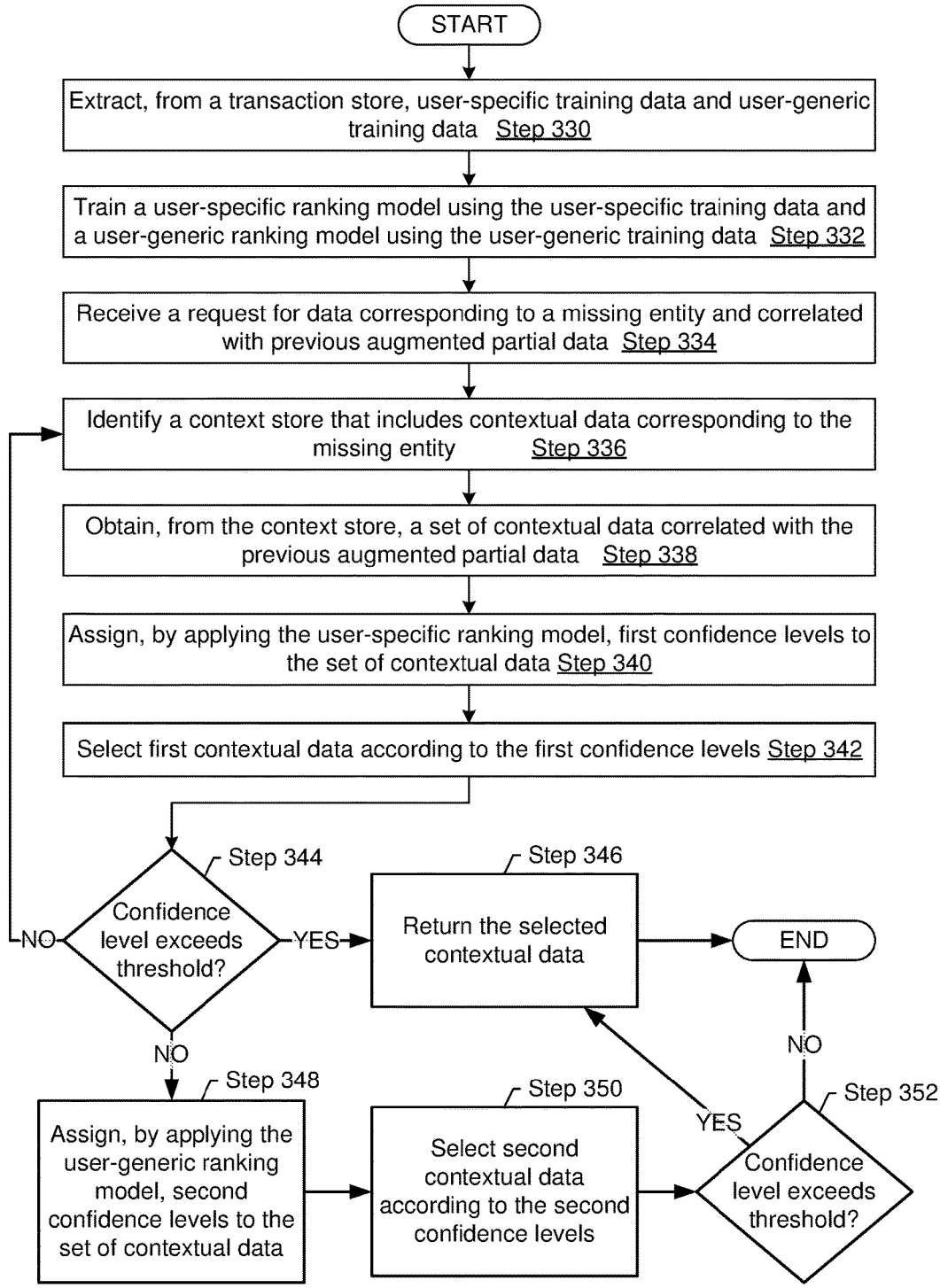

FIG. 3B shows a flowchart in accordance with one or more embodiments of the invention. The flowchart depicts a process for staging transactions. Moreover, the flowchart in FIG. 3B may correspond to Step 304 in FIG. 3A. One or more of the steps in FIG. 3B may be performed by the components (e.g., the contextualizer (154) and stage controller (156) of the staging platform (114)) discussed above in reference to FIG. 1A and FIG. 1B. In one or more embodiments, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 330, user-specific training data and user-generic training data are extracted from a transaction store. User-specific training data may be transaction data specific to a user (e.g., invoices created by a specific user). User-generic training data may be transaction data that is aggregated across users (e.g., invoices created by all users). Alternatively, the user-generic training data may be transaction data corresponding to users sharing a common attribute (e.g., location, income level, profession, etc.).

In Step 332, a user-specific ranking model is trained using the user-specific training data and a user-generic ranking model is trained using the user-generic training data. For example, when sufficient user-specific training data is available, a user-specific ranking model may generate reliable predictions (e.g., predictions with a high confidence level) that are customized to the behavior of the specific user. In one or more embodiments, training data for a ranking model is obtained by extracting partial data and contextual data from existing, completed transaction data. For example, partial data by may extracted by removing a value from an existing transaction data record, where the removed value is designated contextual data, and the remaining values are designated partial data. The values included in the partial data may be input values for the ranking model that may be correlated to predict the value of the contextual data, which functions as the output value. Given a sufficiently large training data set, the ranking model may generate reliable predictions for the value of the output value (e.g., the contextual data), given the input values (e.g., the partial data).

In Step 334, a request for data corresponding to a missing entity and correlated with previous augmented partial data is received. The missing entity may be an entity for which there is no corresponding value in the previous augmented partial data. For example, the previous augmented partial data may correspond to a partially filled out invoice, and the name of the missing entity may be "customer".

In Step 336, a context store is identified that includes data corresponding to the missing entity. Examples of context stores include: email systems, online calendar systems, etc.

In one or more embodiments, the context store is identified based on a schema associated with the context store that defines the entities for which data values are stored in the context store. For example, the context store may be an email system and the contextual data may be the contacts of a user of the email system. Continuing this example, the user (e.g., a business owner) may be a user of the source application that generated the partial data (e.g., by partially filling out an online invoice). In one or more embodiments, the context store is identified, in part, by applying a rule based on a user profile and/or the source application. For example, the user profile may indicate which email system is used by the user.

In one or more embodiments, multiple context stores may be identified (e.g., both an email system and an online calendar system).

In Step 338, a set of contextual data correlated with the previous augmented partial data is obtained from the context store. The contextual data may be correlated with the previous augmented partial data using a matching criterion, which may be based on an identity match, a temporal match, etc. Continuing the example above, the set of contextual data may include the contacts of the user who have exchanged an email message with the user, where a value in the message is matched with a value in the previous augmented partial data (e.g., a service date, a product or service description or identifier, etc. of the partial invoice).

In one or more embodiments, if multiple context stores were identified in Step 336 above, then the set of contextual data includes the sum of the contextual data obtained from each context store. For example, the set of contextual data may include potential customer names obtained from an email system in addition to potential customer names obtained from an online calendar system.

In one or more embodiments, the correlation may be based on a matching criterion. For example, the same or similar identifier may be associated with the name of an entity (e.g., person, product, organization, etc.) referenced by both the previous augmented partial data and the contextual data. Alternatively, a time interval (e.g., a date) may be associated with both the previous augmented partial data and the contextual data. Still alternatively, nearby locations (e.g., as measured by a distance function) may be associated with both the previous augmented partial data and the contextual data.

In one or more embodiments, the context store is the transaction store (e.g., a transaction store that includes invoices) used to train one of the aforementioned ranking models (e.g., the user-specific ranking model and/or the user-generic ranking model). In other words, the training data for the ranking model may include the set of contextual data (e.g., data corresponding to the missing entity) that may be correlated with the previous augmented partial data.

In Step 340, the user-specific ranking model is applied to assign first confidence levels to the set of contextual data (see description of Step 204 above).

In Step 342, first contextual data is selected according to the first confidence levels assigned to the set of contextual data (see description of Step 206 above).

If, in Step 344, the confidence level assigned to the selected contextual data exceeds a predetermined threshold, then in Step 346 the selected contextual data is returned (e.g., to the stage controller, which may then combine the selected contextual data with the previous augmented partial data, as described in Step 306 above). Otherwise, if Step 344 determines that the confidence level assigned to the selected contextual data does not exceed the predetermined threshold, then Step 348 below is executed.

Alternatively, in one or more embodiments, if Step 344 determines that the confidence level assigned to the selected contextual data does not exceed the predetermined threshold, then Step 336, Step 338, Step 340, Step 342, and Step 344 above are repeated in an attempt to obtain, from a different context store, additional contextual data with a confidence level that exceeds the predetermined threshold.

In Step 348, the user-generic ranking model is applied to assign second confidence levels to the set of contextual data (see description of Step 204 above).

In Step 350, second contextual data is selected according to the second confidence levels assigned to the set of contextual data (see description of Step 206 above).

If, in Step 352, the confidence level assigned to the selected contextual data exceeds the predetermined threshold, then in Step 346 the selected contextual data is returned. Otherwise, if the confidence level assigned to the selected contextual data does not exceed the predetermined threshold, then the contextual data may be obtained from the user (e.g., via a user interface).

Figure 4A:
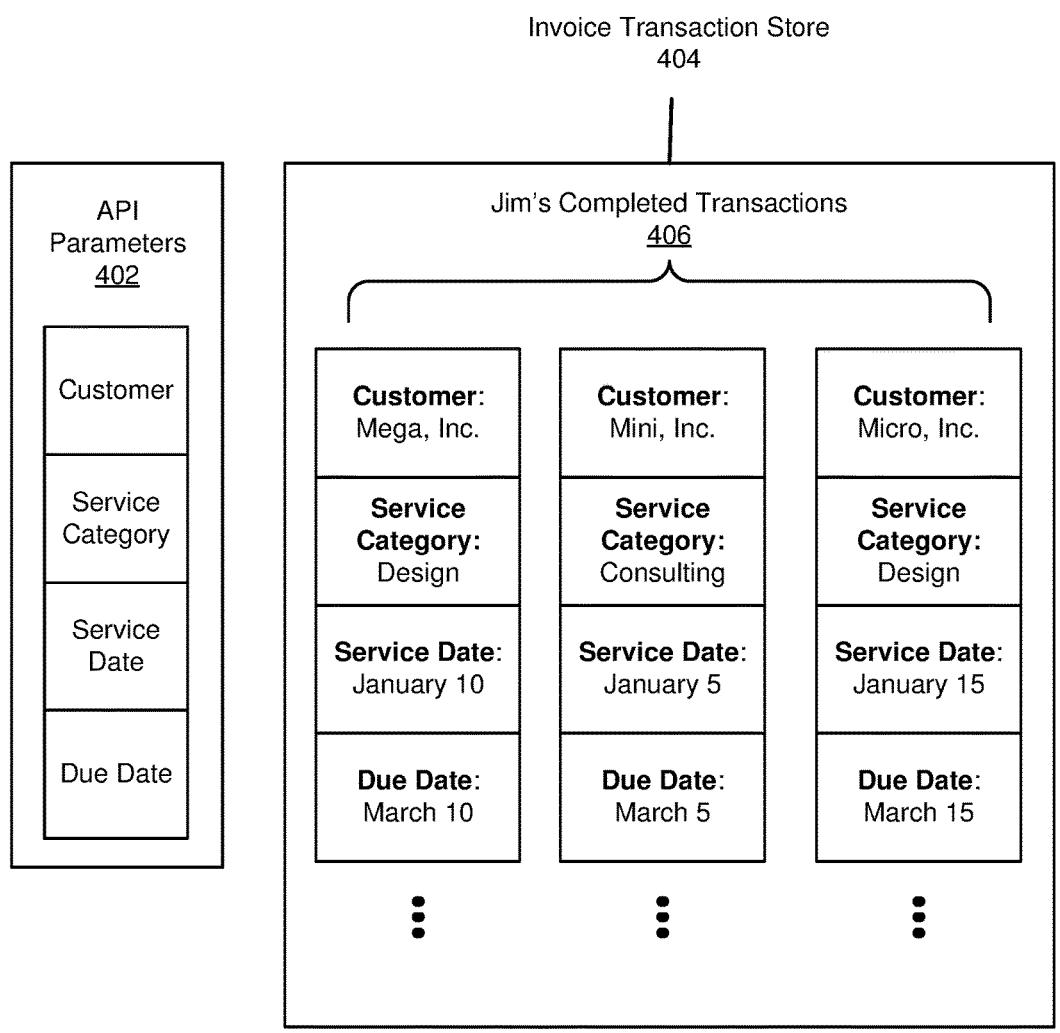
FIG. 4A, FIG. 4B, and FIG. 4C show examples in accordance with one or more embodiments of the invention.
Figure 4B:
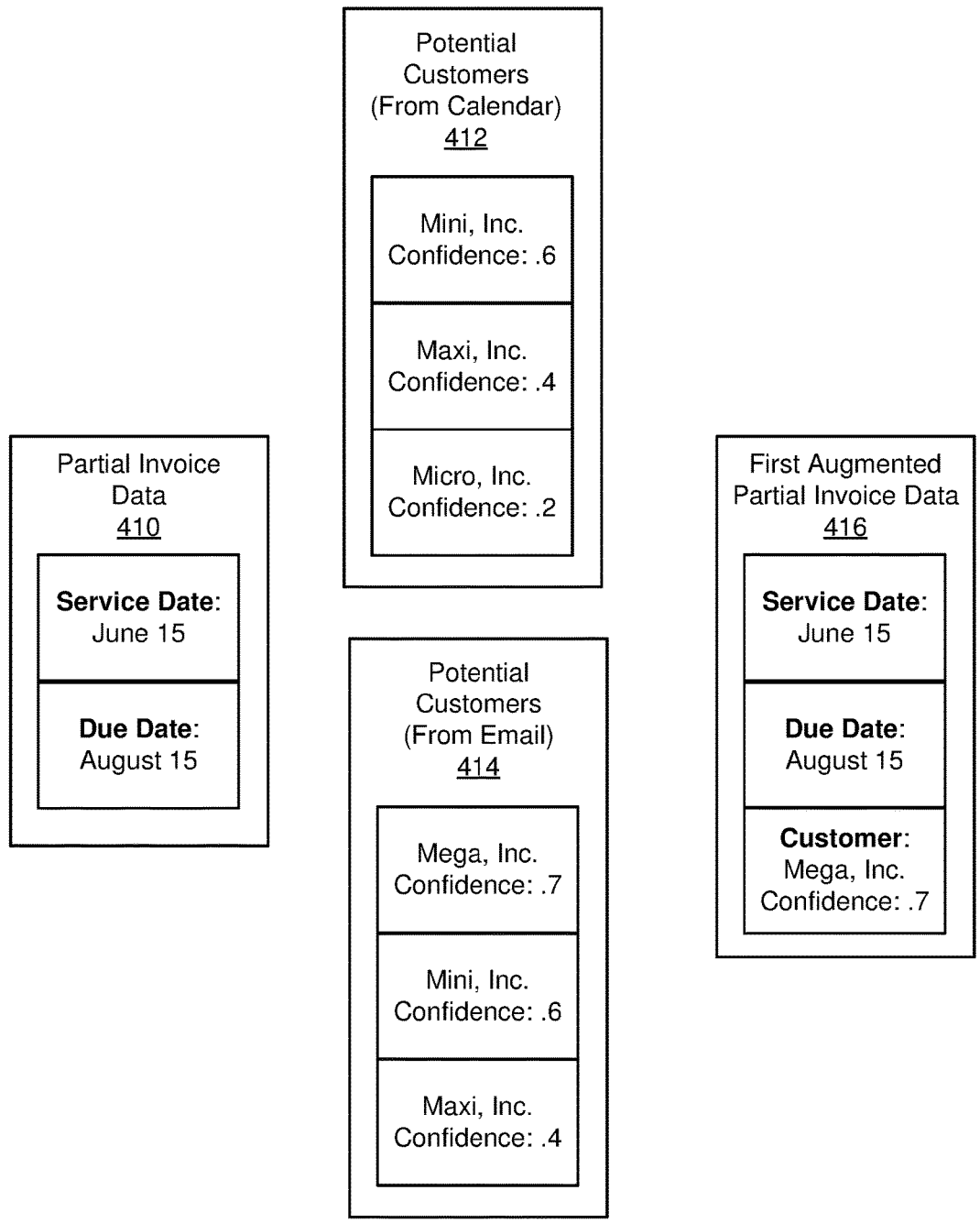
Figure 4C:
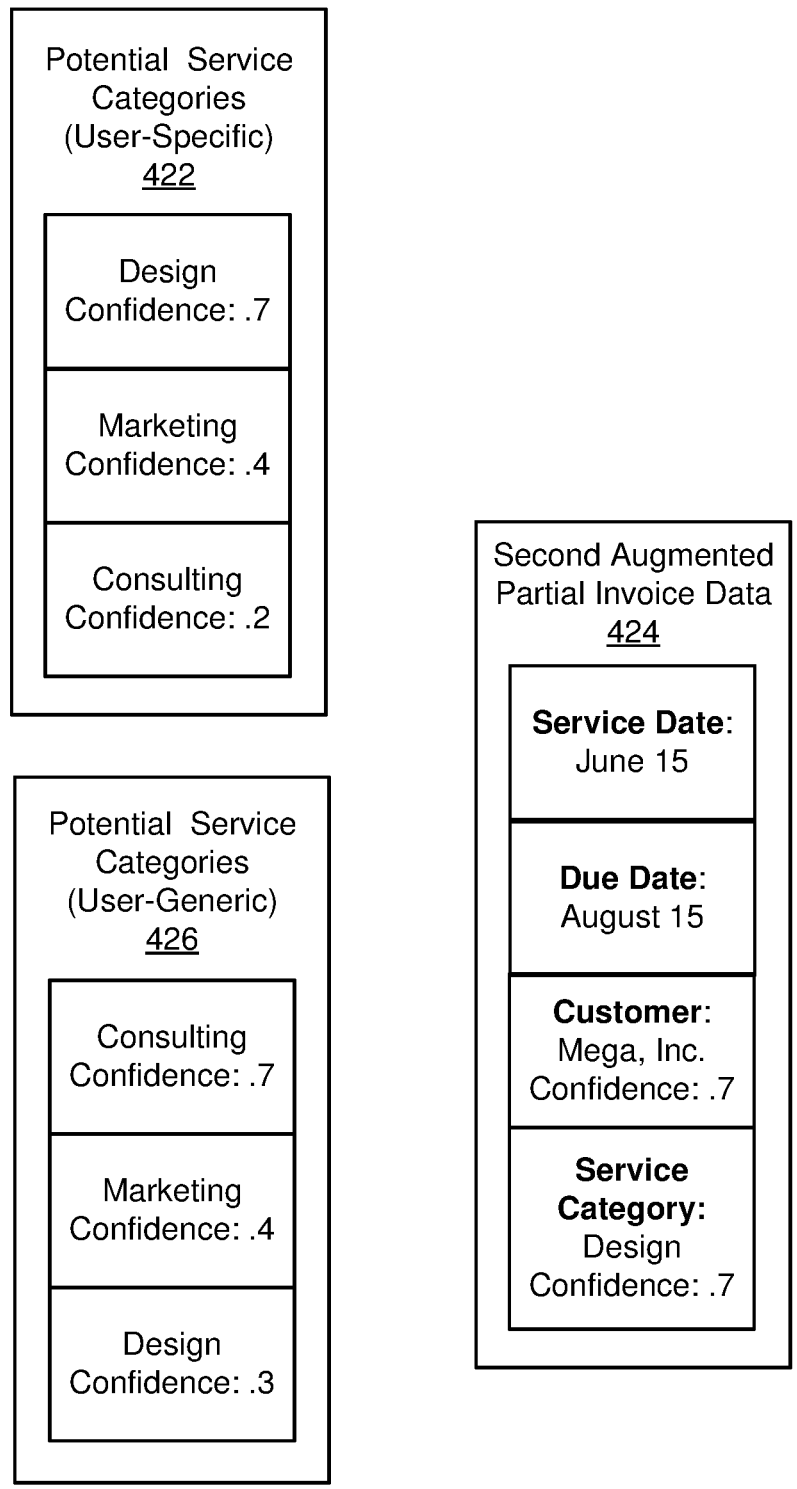

The following example is for explanatory purposes only and not intended to limit the scope of the invention. FIG. 4A, FIG. 4B, and FIG. 4C show an implementation example in accordance with one or more embodiments of the invention. FIG. 4A, FIG. 4B, and FIG. 4C illustrate how partial data provided at an application programming interface (API) representing a partial transaction is enhanced via a succession of contextual data to form a complete transaction that can be posted to a transaction store.

FIG. 4A shows application programming interface (API) parameters (402) customer, service category, service date, and due date, each of which is defined as optional. The staging platform ((114) in FIG. 1A and FIG. 1B) trains a user-specific ranking model for Jim, a small business owner who provides a variety of services to his customers, based on Jim's completed invoice transactions (406) in an invoice transaction store (404). In addition, the staging platform trains a user-generic ranking model based on completed invoice transactions for all users of the invoice transaction store (404).

Initially, as shown in FIG. 4B, the API ((120) in FIG. 1A and FIG. 1B) receives, from a source application ((112) in FIG. 1A and FIG. 1B), partial invoice data (410) corresponding to a partially filled out invoice created by Jim. However, Jim has forgotten certain details of the transaction corresponding to the invoice data, and has not kept accurate records. The partial invoice data (410) lacks values for the customer and service category parameters of the API. The stage controller ((156) in FIG. 1B) then attempts to find contextual data from one or more context stores ((116a, 116n) in FIG. 1A and FIG. 1B) correlated with the partial invoice data (410) that can be combined with the partial invoice data (410) to create a succession of augmented partial data that satisfies an invoice transaction completion criterion. The invoice transaction completion criterion specifies that a value is required for each of the customer, service category, service date, and due date entities.

The stage controller first identifies the customer entity as a missing entity relative to the invoice transaction completion criterion that lacks a corresponding value in the partial invoice data (410). The stage controller then requests contextual data correlated with the partial invoice data (410) from the contextualizer ((154) in FIG. 1B). The contextualizer applies a rule indicating that a value for the customer entity may be obtained from an online calendar system (i.e., a context store). The contextualizer then requests calendar entries correlated with the partial invoice data (410) from Jim's online calendar system. The contextualizer obtains Jim's calendar entries matching the service date of the partial invoice data (410), and extracts a set of potential customers (412) that includes the names associated with the calendar entries. Next, the contextualizer assigns confidence levels to the set of potential customers (412) by applying Jim's user-specific ranking model. The confidence levels are based, in part, on the frequency with which each customer appears in an invoice in the training data for Jim's user-specific ranking model. The contextualizer then selects the customer with the highest confidence level, and determines that the confidence level does not exceed a predetermined threshold of 0.65.

Next, the contextualizer selects a different contextual store from which to obtain contextual data, based on applying a rule indicating that a value for the customer entity may be obtained from an email system. As illustrated in FIG. 4B, the contextualizer identifies a set of potential customers (414) by obtaining, from the email system used by Jim, the names of email users who have received an email from Jim within a threshold time interval (e.g., a number of days) of the service date included in the partial invoice data (410). Next, the contextualizer assigns confidence levels to the set of potential customers (414) by applying Jim's user-specific ranking model. The contextualizer then selects the customer with the highest confidence level, and determines that the confidence level exceeds the predetermined threshold of 0.65. Finally, the contextualizer returns the contextual data to the stage controller.

The stage controller then combines the contextual data received from the contextualizer, in this case the customer name, with the partial invoice data (410), to form first augmented partial invoice data (416), as shown in FIG. 4B. The stage controller then assigns the customer name to the customer parameter of the API.

The stage controller next identifies the service category as a missing entity lacking a corresponding value in the partial invoice data (410). The stage controller then requests contextual data correlated with the partial invoice data (410) from the contextualizer. The contextualizer applies Jim's specific ranking model to obtain service categories correlated with the first augmented partial invoice data (416). Specifically, as illustrated in FIG. 4C, the contextualizer obtains a set of potential service categories (422) correlated with the customer (i.e., Mega, Inc.) included in the first augmented partial invoice data (416). The contextualizer then assigns confidence levels to the set of potential service categories (422) by applying Jim's user-specific ranking model, which was trained on Jim's previous invoice transactions. The confidence levels are based on the frequency with which each service category appears with the customer in the training data of Jim's user-specific ranking model. The contextualizer then selects the service category with the highest confidence level, and determines that the confidence level exceeds the predetermined threshold of 0.65. Finally, the contextualizer returns the contextual data to the stage controller.

The stage controller then combines the contextual data received from the contextualizer, in this case the service category, with the first augmented partial invoice data (416), to form second augmented partial invoice data (424), as shown in FIG. 4C. The stage controller then determines that the second augmented partial invoice data (424) satisfies the transaction completion criterion, and posts the second augmented partial invoice data (424) to the invoice transaction store (404). The stage controller then assigns the service category to the service category parameter of the API.

In an alternate scenario, Jim is a new user who does not yet have a user-specific ranking model. In this alternate scenario, the contextualizer then applies the user-generic ranking model to obtain service categories correlated with the first augmented partial invoice data (416). Specifically, as illustrated in FIG. 4C, the contextualizer obtains a set of potential service categories (426) correlated with the customer (i.e., Mega, Inc.) included in first augmented partial invoice data (416). The contextualizer then assigns confidence levels to the set of potential service categories (426) by applying the user-generic ranking model. The confidence levels are based on the frequency with which each service category appears with the customer in the training data of the user-generic ranking model. The contextualizer then selects the service category with the highest confidence level, and determines that the confidence level exceeds the predetermined threshold of 0.65.

Figure 5A:
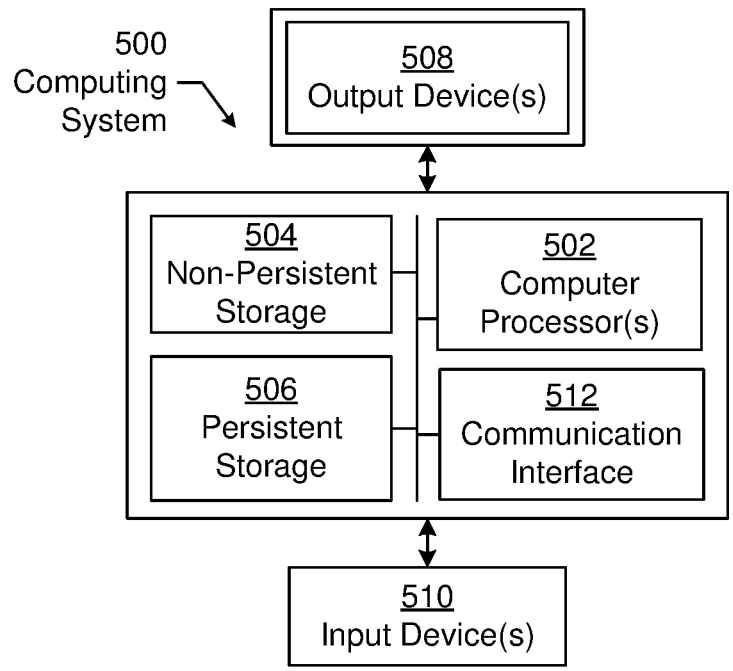
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
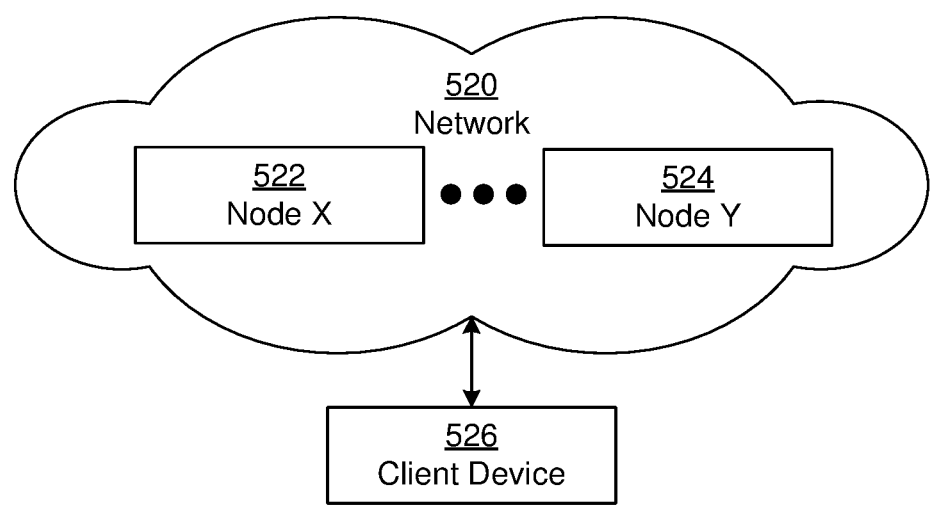

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   receiving, via a network and from a source application, partial data comprising values for a plurality of parameters defined according to an application programming interface (API), wherein each of the plurality of parameters is defined by the API as optional, wherein the partial data is incomplete for use by a target application;
   obtaining a first set of contextual data correlated with the partial data;
   generating augmented partial data by combining the partial data and first contextual data selected from the first set of contextual data;
   determining that the augmented partial data satisfies a transaction completion criterion of a transaction schema; and
   in response to determining that the augmented partial data satisfies the transaction completion criterion, sending the augmented partial data to a transaction store used by the target application.

2. The method of claim 1, further comprising:
   assigning the first contextual data to a parameter of the plurality of parameters without a corresponding value in the partial data.

3. The method of claim 1, further comprising:
   assigning, using a first ranking model, a first plurality of confidence levels to the first set of contextual data, wherein the first contextual data is selected according to the first plurality of confidence levels;
   in response to determining that no confidence level in the first plurality of confidence levels exceeds a threshold, obtaining a second set of contextual data correlated with the partial data;
   assigning, using the first ranking model, a second plurality of confidence levels to the second set of contextual data;
   selecting second contextual data according to the second plurality of confidence levels assigned to the second set of contextual data; and
   determining that the confidence level assigned to the second contextual data exceeds the threshold,
   wherein generating the augmented partial data comprises combining the second contextual data with the partial data after determining that the first contextual data is not assigned a confidence level satisfying the threshold.

4. The method of claim 3, further comprising:
   identifying a first context store using a first rule based on a user profile, wherein the first set of contextual data is received from the first context store in response to sending a first request for data correlated with the partial data; and
   identifying a second context store using a second rule based on the user profile, wherein the second set of contextual data is received from the second context store in response to sending a second request for data correlated with the partial data.

5. The method of claim 4, wherein obtaining the first set of contextual data comprises matching, using a predefined matching criterion, the partial data with contextual data of the first context store.

6. The method of claim 1, further comprising:
   extracting, from the transaction store, user-specific training data comprising transaction data for a user; and
   training the first ranking model using the user-specific training data.

7. The method of claim 1, further comprising:
   assigning, using a first ranking model, a first plurality of confidence levels to the first set of contextual data, wherein the first contextual data is selected according to the first plurality of confidence levels; and
   in response to determining that no confidence level in the first plurality of confidence levels exceeds a threshold:
      extracting, from the transaction store, user-generic training data comprising transaction data for a group of users;
      training a second ranking model using the user-generic training data;
      assigning, using the second ranking model, a second plurality of confidence levels to the first set of contextual data;
      selecting second contextual data according to the second plurality of confidence levels assigned to the first set of contextual data; and
      determining that the confidence level assigned to the second contextual data exceeds the threshold,
   wherein generating the augmented partial data comprises combining the second contextual data with the partial data after determining that the first contextual data is not assigned a confidence level satisfying the threshold.

8. A system, comprising:
   a memory coupled to a processor;
   a repository comprising augmented partial data, a first ranking model, and a transaction schema comprising a transaction completion criterion;
   an application programming interface (API) that defines a plurality of parameters, wherein each of the plurality of parameters is defined as optional;
   a stage controller executing on the processor and using the memory, configured to:
      receive, via a network and from a source application, partial data comprising values for one or more of the plurality of parameters, wherein the partial data is incomplete for use by a target application;
      generate the augmented partial data by combining the partial data and first contextual data selected from a first set of contextual data correlated with the partial data;
      determine that the augmented partial data satisfies the transaction completion criterion; and
      in response to determining that the augmented partial data satisfies the transaction completion criterion, send the augmented partial data to a transaction store used by the target application; and
   a contextualizer executing on the processor and using the memory, configured to:
      obtain the first set of contextual data.

9. The system of claim 8, wherein the stage controller is further configured to:
   assign the first contextual data to a parameter of the plurality of parameters without a corresponding value in the partial data.

10. The system of claim 8,
wherein the system further comprises a first ranking model, and
wherein the contextualizer is further configured to:
assign, using the first ranking model, a first plurality of confidence levels to the first set of contextual data, wherein the first contextual data is selected according to the first plurality of confidence levels; and
in response to determining that no confidence level in the first plurality of confidence levels exceeds a threshold:
obtain a second set of contextual data correlated with the partial data;
assign, using the first ranking model, a second plurality of confidence levels to the second set of contextual data;
select second contextual data according to the second plurality of confidence levels assigned to the second set of contextual data; and
determine that the confidence level assigned to the second contextual data exceeds the threshold,
wherein generating the augmented partial data comprises combining the second contextual data with the partial data after determining that the first contextual data is not assigned a confidence level satisfying the threshold.

11. The system of claim 10, wherein the contextualizer is further configured to:
identify a first context store using a first rule based on a user profile, wherein the first set of contextual data is received from the first context store in response to sending a first request for data correlated with the partial data; and
identify a second context store using a second rule based on the user profile, wherein the second set of contextual data is received from the second context store in response to sending a second request for data correlated with the partial data.

12. The system of claim 11, wherein the contextualizer is further configured to obtain the first set of contextual data by matching, using a predefined matching criterion, the partial data with contextual data of the first context store.

13. The system of claim 8, wherein the contextualizer is further configured to:
extract, from the transaction store, user-specific training data comprising transaction data for a user; and
train the first ranking model using the user-specific training data.

14. The system of claim 8,
wherein the repository further comprises a first ranking model and a second ranking model, and
wherein the contextualizer is further configured to:
assign, using the first ranking model, a first plurality of confidence levels to the first set of contextual data, wherein the first contextual data is selected according to the first plurality of confidence levels; and
in response to determining that no confidence level in the first plurality of confidence levels exceeds a threshold:
extract, from the transaction store, user-generic training data comprising transaction data for a group of users;
train the second ranking model using the user-generic training data;
assign, using the second ranking model, a second plurality of confidence levels to the first set of contextual data;
select second contextual data according to the second plurality of confidence levels assigned to the first set of contextual data; and
determine that the confidence level assigned to the second contextual data exceeds the threshold,
wherein generating the augmented partial data comprises combining the second contextual data with the partial data after determining that the first contextual data is not assigned a confidence level satisfying the threshold.

15. An application programming interface (API), comprising executable code stored in a memory and executed on a processor, further comprising instructions that perform:
receiving, via a network and from a source application, partial data comprising values for one or more of a plurality of parameters, wherein each of the plurality of parameters is defined as optional, wherein the partial data is incomplete for use by a target application; and
transmitting, to a staging platform executing on the processor and using the memory, the partial data, wherein the staging platform:
obtains a first set of contextual data correlated with the partial data;
generates augmented partial data by combining the partial data and first contextual data selected from the first set of contextual data;
determines that the augmented partial data satisfies a transaction completion criterion of a transaction schema; and
in response to determining that the augmented partial data satisfies the transaction completion criterion, sends the augmented partial data to a transaction store used by the target application.

16. The API of claim 15, further comprising instructions that perform:
assigning the first contextual data to a parameter of the plurality of parameters without a corresponding value in the partial data.

17. The API of claim 15, wherein the staging platform further:
assigns, using a first ranking model, a first plurality of confidence levels to the first set of contextual data, wherein the first contextual data is selected according to the first plurality of confidence levels;
in response to determining that no confidence level in the first plurality of confidence levels exceeds a threshold, obtains a second set of contextual data correlated with the partial data;
assigns, using the first ranking model, a second plurality of confidence levels to the second set of contextual data;
selects second contextual data according to the second plurality of confidence levels assigned to the second set of contextual data; and
determines that the confidence level assigned to the second contextual data exceeds the threshold,
wherein generating the augmented partial data comprises combining the second contextual data with the partial data after determining that the first contextual data is not assigned a confidence level satisfying the threshold.

18. The API of claim 17, wherein the staging platform further:
identifies a first context store using a first rule based on a user profile, wherein the first set of contextual data is received from the first context store in response to sending a first request for data correlated with the partial data; and identifies a second context store using a second rule based on the user profile, wherein the second set of contextual data is received from the second context store in response to sending a second request for data correlated with the partial data.

19. The API of claim 18, wherein the staging platform further obtains the first set of contextual data by matching, using a predefined matching criterion, the partial data with contextual data of the first context store.

20. The API of claim 15, wherein the staging platform further:
   extracts, from the transaction store, user-specific training data comprising transaction data for a user; and
   trains the first ranking model using the user-specific training data.

* * * * *